United States Patent
Nakatani et al.

(10) Patent No.: US 12,510,504 B2
(45) Date of Patent: Dec. 30, 2025

(54) MEASUREMENT METHOD AND MEASUREMENT APPARATUS

(71) Applicant: ARKRAY, Inc., Kyoto (JP)

(72) Inventors: Ayano Nakatani, Kyoto (JP); Takeshi Shimizu, Kyoto (JP)

(73) Assignee: ARKRAY, Inc., Kyoto (JP)

( * ) Notice: Subject to any disclaimer, the term of this patent is extended or adjusted under 35 U.S.C. 154(b) by 503 days.

(21) Appl. No.: 17/940,702

(22) Filed: Sep. 8, 2022

(65) Prior Publication Data

US 2023/0086219 A1   Mar. 23, 2023

(30) Foreign Application Priority Data

Sep. 16, 2021   (JP) ................................ 2021-151381
Oct. 29, 2021   (JP) ................................ 2021-178208

(51) Int. Cl.
*G01N 27/327* (2006.01)
*G01N 33/49* (2006.01)

(52) U.S. Cl.
CPC ..... *G01N 27/3272* (2013.01); *G01N 27/3274* (2013.01); *G01N 33/49* (2013.01); *B01L 2300/0645* (2013.01)

(58) Field of Classification Search
None
See application file for complete search history.

(56) References Cited

U.S. PATENT DOCUMENTS

| | | |
|---|---|---|
| 5,264,103 A | 11/1993 | Yoshioka et al. |
| 2006/0240540 A1 | 10/2006 | Nakatsuka |
| 2015/0059448 A1 | 3/2015 | Shinno et al. |
| 2015/0153301 A1 | 6/2015 | Yoshioka |
| 2017/0023517 A1 | 1/2017 | Yoshioka |

FOREIGN PATENT DOCUMENTS

| | | |
|---|---|---|
| JP | H05-340915 A | 12/1993 |
| JP | 2008-157708 A | 7/2008 |
| JP | 2011-095279 A | 5/2011 |
| KR | 10-2016-0004434 A | 1/2016 |

(Continued)

OTHER PUBLICATIONS

Office Action issued in Japanese Patent Application No. 2021-178208 dated Dec. 3, 2024.

(Continued)

*Primary Examiner* — J. Christopher Ball
(74) *Attorney, Agent, or Firm* — Morgan, Lewis & Bockius LLP (57) ABSTRACT

Using a biosensor including a flow path into which blood containing a target is introduced, an upstream electrode pair disposed in the flow path and having a reagent reacting with the target disposed on either of the electrodes, and a downstream electrode pair disposed at a downstream side of the flow path; the method includes a first detection step of detecting a first introduction of blood as far as the upstream electrode pair; a second detection step of detecting a second introduction of blood as far as the downstream electrode pair; a time measurement step of measuring a time difference from the first introduction to the second introduction; and a measurement step of acquiring the value related to the target based on the time difference by using any two electrodes among the upstream and downstream electrode pair after the second introduction is detected.

19 Claims, 7 Drawing Sheets

(56) References Cited

FOREIGN PATENT DOCUMENTS

| WO | 2005/083413 | A1 | 9/2005 |
| WO | 2013/157263 | A1 | 10/2013 |
| WO | 2013/183215 | A1 | 12/2013 |

OTHER PUBLICATIONS

Extended European Search report dated Jan. 27, 2023, issued in corresponding European Patent Application No. 22194337.6.
Shin et al., "Estimation of glucose concentration using adaptive calibration curve in different hematocrit levels," Electronics Letters, the Institution of Engineering and Technology, 49(9): 584-585 (2013).
Office Action issued in corresponding Japanese Patent Application No. 2021-178208, dated Apr. 22, 2025.
Office Action issued in the corresponding EP Application No. 22194337.6, dated Jan. 2, 2025.

MEASUREMENT METHOD AND MEASUREMENT APPARATUS

CROSS-REFERENCE TO RELATED APPLICATION

This application claims priority under 35 USC 119 from Japanese Patent Applications No. 2021-151381, filed on Sep. 16, 2021, and No. 2021-178208, filed on Oct. 29, 2021, the disclosure of which are incorporated by reference herein.

BACKGROUND

Technical Field

The present invention relates to a measurement method and a measurement apparatus for measuring a target in blood.

Related Art

In a biosensor having a flow path for guiding a spot-applied liquid specimen to a measurement electrode by capillary action, it is necessary to detect whether the flow path is sufficiently filled with the specimen. Therefore, for such detection, an electrode located furthermost downstream in the flow path is usually used. In many biosensors, an electrode for detecting a specimen is provided at the furthermost downstream side of a flow path, where the electrode at the furthermost downstream side is used as a working electrode for detecting a specimen, and an electrode for measuring a target such as glucose is also used as a counter electrode.

Japanese Patent Application Laid-Open No. 2008-157708 discloses a microchip that collects droplets by capillary action, the microchip including: an injection port having a larger injection width than that of the droplets and having a recess in a protrusion protruding from a main body portion to which the microchip is attached; and a capillary cavity coupled to a holding chamber that holds fluid collected through the injection port, in which the capillary cavity communicating with the injection port is configured to be in contact with outside air with a side portion of the protrusion also opened.

WO 2013/183215 discloses, for the purpose of improving measurement accuracy in a biological information measurement apparatus that measures a blood glucose level, a configuration in which a plurality of various factors affecting variations in measurement of biological information are regarded as changes in current values by applying different voltage values from a voltage application unit between a first input terminal and a second input terminal at a first time and a second time, a biological information correction value is calculated from the changes in current values, and the measured biological information value is corrected by the biological information correction value.

SUMMARY

An embodiment of the present disclosure provides a measurement method and a measurement apparatus for measuring a target in blood using a biosensor, the measurement method and the measurement apparatus being capable of obtaining a correct value even when blood is additionally spot-applied to the biosensor.

One aspect of the present disclosure is a measurement method for measuring a value of a target using a biosensor including a flow path into which blood containing the target is introduced, an upstream electrode pair disposed in the flow path and in which a reagent, which reacts with the target, is disposed on at least one of the electrodes, and a downstream electrode pair disposed at a downstream side of the flow path with respect to the upstream electrode pair. This measurement method includes a first detection step of detecting, with an upstream electrode pair, first introduction, which is introduction of blood as far as an upstream electrode pair, a second detection step of detecting, with a downstream electrode pair, second introduction, which is introduction of blood as far as a downstream electrode pair, a time measurement step of measuring a time difference from a temporal reference point at which the first introduction is detected to a temporal reference point at which the second introduction is detected, and a measurement step of acquiring a value related to a target based on the time difference measured in the time measurement step using two electrodes, which are an electrode on which the reagent is disposed of the upstream electrode pair and an electrode provided in the flow path, after the second introduction is detected.

According to an embodiment of the disclosure, in a measurement method and a measurement apparatus for measuring a target in blood using a biosensor, the correct value can be obtained even when blood is additionally spot-applied to the biosensor.

BRIEF DESCRIPTION OF THE DRAWINGS

Exemplary embodiments will be described in detail based on the following figures, wherein.

DETAILED DESCRIPTION

Hereinafter, a measurement method and a measurement apparatus according to an exemplary embodiment of the disclosure will be described. In the following description, "upstream side" and "downstream side" are defined along the direction in which the blood spot-applied to the biosensor flows in the flow path.

(1) Measurement Method

A measurement method according to the present exemplary embodiment is a measurement method for measuring a value of a target using a biosensor including a flow path into which blood containing the target is introduced, an upstream electrode pair disposed in the flow path and in which a reagent, which reacts with the target, is disposed on at least one of the electrodes, and a downstream electrode pair disposed at a downstream side of the flow path with respect to the upstream electrode pair. This measurement method includes a first detection step of detecting, with the upstream electrode pair, first introduction, which is introduction of blood as far as the upstream electrode pair, a second detection step of detecting, with the downstream electrode pair, second introduction, which is introduction of blood as far as the downstream electrode pair, a time measurement step of measuring a time difference from a temporal reference point at which the first introduction is detected to a temporal reference point at which the second introduction is detected, and a measurement step of acquiring a value related to a target based on the time difference measured in the time measurement step using two electrodes, which are an electrode on which the reagent is disposed of the upstream electrode pair and an electrode provided in the flow path, after the second introduction is detected.

The target refers to a chemical component contained in the blood, and is, for example, glucose (blood sugar) or lactate (lactic acid). The upstream electrode pair is a pair of electrodes located on the upstream side of the flow path, and a reagent is disposed on at least one of the electrodes. In the upstream electrode pair, the entire surface of the electrode pair may be covered with the reagent, but it is desirable that the reagent is disposed only on the electrode at the downstream side of the upstream electrode pair. The reagent is a chemical substance that reacts with a target, and may include, for example, an enzyme and a mediator. The downstream electrode pair is a pair of electrodes located at the downstream side of the upstream electrode pair. Here, the upstream electrode pair and the downstream electrode pair may share some electrodes, but are desirably formed of different electrodes. In addition, the reagent may also be disposed on the downstream electrode pair, or may have a shape continuing from the reagent disposed on the upstream electrode pair.

As the upstream electrode pair is electrically conducted via the blood spot-applied to the flow path, the first introduction that means that the blood is introduced to the upstream electrode pair is detected. In addition, a temporal reference point at which the first introduction is detected is also acquired. The step of detecting the first introduction is referred to as a first detection step.

The first detection step desirably includes a step of applying a pulse voltage between the upstream electrode pair, a step of measuring a peak value of a response current corresponding to the applied pulse voltage, and a step of determining whether or not the measured peak value exceeds a predetermined current threshold value, and detecting the first introduction when the exceeded number of times is a predetermined number of times or larger. That is, when the peak value of the response current is measured by the pulse wave of the pulse voltage, a higher value can be obtained than when the DC voltage having the same value is applied. For example, it is desirable that the frequency of the pulse wave is from 1 to 2000 Hz (the period is from 0.5 msec to 1 sec.), the potential difference from the base to the peak of the pulse wave is from 50 to 1000 mV, and the time during which the pulse wave rises from the base to the peak is 30 μs or less. When the time is 30 μs or less, the peak value of the response signal can be generated with high accuracy. Note that the predetermined number of times may be once, but is desirably a plurality of times or even three times in order to avoid erroneous determination due to a high peak value incidentally obtained by a noise component such as static electricity. The temporal reference point at which the introduction of the blood in the first detection step is detected may be a time point at which the measured peak value is detected or a time point at which such peak value exceeds the predetermined current threshold value. Moreover, in a case where the detection is performed a plurality of times, the temporal reference point may be a time point at which the peak value in the last measurement is detected or a time point at which such a peak value exceeds the predetermined current threshold value.

Next, as the downstream electrode pair is electrically conducted via the blood, the second introduction that means that the blood is introduced to the downstream electrode pair is detected. The step of detecting the second introduction is referred to as a second detection step. It is desirable that one electrode of the downstream electrode pair is provided at the furthermost downstream side of the flow path. In such a case, it can be contemplated that the entire flow path is filled with blood if detection is made that the blood is introduced up to the downstream electrode pair.

The second detection step desirably includes a step of applying voltage between the downstream electrode pair, a step of measuring a response current corresponding to the applied voltage, and a step of determining whether or not the measured response current value exceeds a predetermined current threshold value, and detecting the second introduction when the predetermined number of times is exceeded. Similarly to the first introduction, a temporal reference point at which the second introduction is detected is also acquired. The voltage applied in the second detection step is a DC voltage, and determination may be made on whether or not the measured response current value exceeds a predetermined current threshold value. The temporal reference point at which the introduction of the blood in the second detection step is detected may be a time point at which the measured response current value exceeds a predetermined current threshold value, or may be a time point at which the highest value of the response current value is detected.

In the time measurement step, a time difference from the detection of the first introduction to the detection of the second introduction is measured. Specifically, a time difference from a temporal reference point at which introduction of blood in the second detection step is detected to a temporal reference point at which introduction of blood in the first detection step is detected may be calculated. Note that the respective temporal reference point may be stored with time, and a difference therebetween may be assumed as a time difference, or a result of counting a time from the temporal reference point in the first detection step to detection of the temporal reference point in the second detection step may be assumed as a time difference.

Then, after the second introduction is detected, a measurement step of acquiring a value related to the target in the blood using two electrodes at least including the electrode on which the reagent is disposed in the upstream electrode pair is executed. The other electrode of the two electrodes is desirably either an electrode of the upstream electrode pair or an electrode of the downstream electrode pair, and is more desirably an electrode located on the upstream side of the downstream electrode pair. However, the other electrode may be an electrode other than the upstream electrode pair and the downstream electrode pair, for example, an electrode formed between an electrode at the downstream side of the upstream electrode pair and an electrode on the upstream side of the downstream electrode pair. In this measurement step, a value is acquired based on the time difference measured in the time measurement step.

Here, at the time point at which the first introduction is detected, the specimen has reached the upstream electrode pair including the electrode on which the reagent is disposed. Then, in a case where the time difference until the detection of the second introduction is longer than a normal value (e.g., less than 0.5 seconds), it can be assumed that blood is spot-applied to the flow path twice, that is, the blood is additionally spot-applied. Particularly, when the time difference until the detection of the second introduction is longer than a predetermined value (e.g., 5 seconds) longer than the normal value, most of the reagents that should be involved in the reaction with the target are dissolved on the electrode, and thus the reagent is washed away toward the downstream side from the position where the reagent was disposed by the blood spot-applied the second time. As a result, when the value of the target is measured, the amount of reagent that should be involved in the reaction with the target on the electrode decreases (or be exhausted) as compared with a case where the time difference is an original extremely short time (i.e., in a case where a sufficient amount of blood is spot-applied in one spot-application), and, as a result, the amount of the target that reacts with the reagent decreases, and, as a result, the response current value also decreases. On the other hand, in a case where the time difference until the detection of the second introduction is longer than the normal value and shorter than the predetermined value (e.g., from 0.5 to 5 seconds), although the reagent on the electrode is somewhat dissolved in the first spot-application but the amount of the reagent washed away toward the downstream side is small, the reagent is dissolved while being left untouched from the first spot-application to the second spot-application and the reaction between the target and the reagent proceeds, as compared with a normal case where a sufficient amount of blood is spot-applied in one spot-application (e.g., in a case of a normal value where the time difference is less than 0.5 seconds). Therefore, at the time point at which a voltage is applied to obtain a value, the reaction between the target and the reagent is in a state more progressed than in a normal case. In other words, since the response current response value in a state where the reaction rate is high is measured, the reaction is enhanced as a result, and the response current value is increased.

Therefore, in the measurement step, it is desirable to first execute a preliminary measurement step of acquiring a parameter related to the target using the two electrodes, and then execute a correction step of correcting the parameter based on the time difference to acquire a value. The parameter referred to herein may be, for example, a response current value obtained by applying a voltage between electrodes, or may be a provisional concentration of the target obtained by applying a response current value to a calibration curve obtained from a response current value measured with blood containing the target having a known concentration. The value referred to in the present exemplary embodiment may be a response current value corresponding to a true concentration obtained by applying a voltage between electrodes, or may be a true concentration of the target obtained by applying the response current value to a calibration curve obtained from the response current value measured in advance with blood containing the target having a known concentration.

Then, in the correction step, with reference to correction information used for correction calculation of the parameter in accordance with time difference, the parameter is corrected based on the time difference to acquire the value. In a case where the time difference is longer than the normal value and less than the predetermined value, the correction information is arithmetic information for subtracting a numerical value of the parameter increased by the enhancement of the reaction at the electrode by decreasing the numerical value of the obtained parameter, and the numerical value of the true concentration is thereby estimated. Furthermore, in a case where the time difference is the predetermined value or larger, the correction information is arithmetic information for increasing the parameter discounted by the decrease in the reaction at the electrode by increasing the numerical value of the obtained parameter, and the numerical value of the true concentration is thereby estimated. However, in a case where the time difference exceeds a limit value (e.g., longer than 10 seconds), error processing is performed, and a numerical value may not be estimated. Examples of the error processing include, for example, visually displaying an error message on a display screen, issuing a warning sound by an audio display device, and interrupting the processing. Here, the correction information may be a correction coefficient to be described later, or may be a calibration curve or a comparative table based on a value obtained by measuring blood containing a target having a known concentration.

For example, in a case where a sufficient amount of blood that can fill the flow path is caused to flow through the flow path of the biosensor in advance for a plurality of blood, a time difference (elapsed time) between the temporal reference point of the first introduction and the temporal reference point of the second introduction may be measured in advance, and the normal value may be set as an average value or a median value of such plurality of time differences. In addition, a value obtained in a case of a very short time difference, in which the influence of the dissolution of the reagent does not substantially appear in the parameter in the blood described above, can also be defined as the normal value.

As the predetermined value, for example, a ratio between a parameter in a case where the additional spot-application is performed on a plurality of blood with various time differences in advance and a parameter in a case where the time difference is a normal value is calculated, and an inflection point at which the calculation result changes from a value higher than 100% to a value lower than 100%, that is, a time difference of 100% may be set as the predetermined value. As the predetermined value is a threshold value at a time difference, it can be said as a time threshold value.

Here, as a correction method in the correction step, for example, parameters in a case where additional spot-application is performed on a plurality of specimens with various time differences are measured in advance. A correction coefficient calculated from the proportion of the divergence degree of the parameter with respect to the parameter measured when the time difference is zero is obtained for each of various time differences and stored in a data table, and the parameter acquired in the preliminary measurement step can be multiplied by the correction coefficient corresponding to the measured time difference. Note that the time difference of zero may be referred to as a time difference of a normal value.

For example, when the parameter in the case of the time difference of zero is $P_0$ and the parameter in the case of the time difference t (second) is $P_t$, the divergence degree X (%) can be calculated by the following Formula (1).

$$X=(P_0-P_t)/P_0\times100 \qquad (1)$$

For example, the divergence degree X will be a positive value when t is less than a predetermined value, and the divergence degree X will be a negative value when t is a predetermined value or larger. Then, from the divergence degree X, the correction coefficient C can be calculated by the following Formula (2).

$$C=100/(100+X) \quad (2)$$

That is, when t is less than the predetermined value, the divergence degree X is a positive value, and thus the correction coefficient C becomes a value less than 1, and the numerical value of the parameter multiplied by C will decrease. On the other hand, when t is the predetermined value or larger, the divergence degree X is a negative value, and thus the correction coefficient C becomes a value or 1 or larger, and the numerical value of the parameter multiplied by C will increase.

Here, when the value of the time difference when the actual blood specimen is measured does not correspond to the value in the data table described above, the correction coefficient C can be calculated by performing linear interpolation from the value of the correction coefficient C corresponding to the time difference located before and after the value of the measured time difference in the data table.

Note that the method of correcting the parameter based on the correction coefficient is an example, the parameter in a case where additional spot-application is performed on a plurality of specimens with various time differences in advance is measured, and the parameter may be corrected with reference to correction information used for correction calculation the parameter, such as a calibration curve or a comparative table calculated from the proportion of the divergence degree with respect to the parameter measured in a case where the time difference is zero.

In the measurement step, the measurement condition based on the time difference may be selected after the second introduction is detected, and the value may be acquired based thereon without correcting the parameter as described above. Specifically, examples include a method of changing measurement conditions such as changing a voltage applied between electrodes or changing a timing of measuring a response current value. For example, the response current value acquired by weakening the voltage applied between the electrodes when the time difference is less than the predetermined value as compared with the case where the time difference is zero can be decreased, and the response current value can be increased by increasing the voltage applied between the electrodes when the time difference is a predetermined value or larger as compared with the case where the time difference is zero. As for the applied voltage value in this case, for example, when the voltage value applied in the case where the time difference is zero is $E_0$, the voltage value $E_t$ applied in the case of the time difference t can be calculated by the following Formula (3) using the correction coefficient C.

$$E_t=E_0 \times C \quad (3)$$

Then, the response current value obtained by applying the voltage of the voltage value $E_t$ between the electrodes is applied to a predetermined calibration curve, whereby the value regarding the target can be acquired.

The measurement may be corrected based on a value of another item different from the target acquired using any two electrodes disposed in the flow path of the biosensor including the electrodes of the upstream electrode pair and the downstream electrode pair. Another item includes, for example, a hematocrit value. For example, the correction based on the hematocrit value can be performed by measuring the divergence degree X with blood having various hematocrit values, creating a data table of the correction coefficient C in advance for each hematocrit value, and selecting a data table corresponding to the hematocrit value measured in the measurement step. When there is no data table corresponding to the actually measured hematocrit value, correspondence can be made by performing linear interpolation from the data table corresponding to the hematocrit values before and after the measured hematocrit value.

(2) Measurement Apparatus

Figure 1:
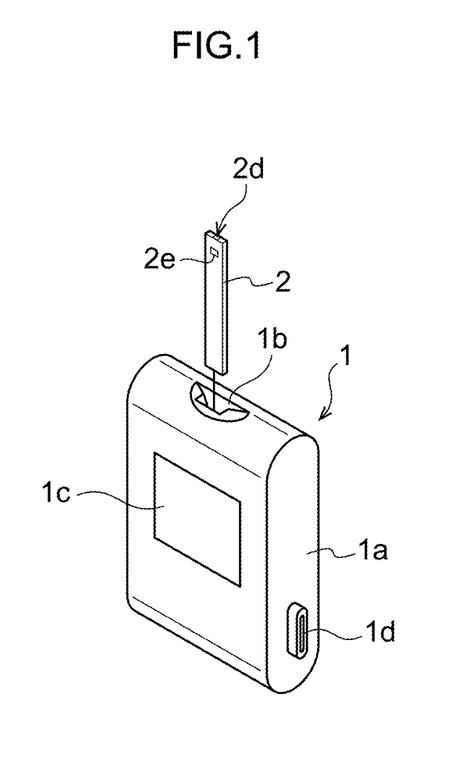
FIG. 1 is a perspective view illustrating an outer appearance of a measurement apparatus according to an exemplary embodiment.

An exemplary embodiment of a measurement apparatus that performs the measurement method described above will be described below. FIG. 1 is a perspective view illustrating an outer appearance of a measurement apparatus 1 according to the present exemplary embodiment. The present exemplary embodiment is an example of a case in which the measurement apparatus 1 is a portable blood glucose meter, by way of example. In FIG. 1, a portable blood glucose meter serving as a measurement apparatus 1 and a biosensor 2 configured to be detachable from the measurement apparatus 1 are provided. The biosensor 2 is formed with a blood supply port 2d serving as an introduction port of the flow path 2a so that patient's blood serving as a sample is introduced into the flow path 2a described later, and an air hole 2e for discharging air in the flow path 2a due to introduction of blood, and is configured to have a function for detecting a blood glucose level (glucose value) in the blood. The measurement apparatus 1 shown in FIG. 1 can be used as, for example, a blood glucose meter such as a portable blood glucose measuring device or a self-measuring blood glucose meter.

Figure 3:
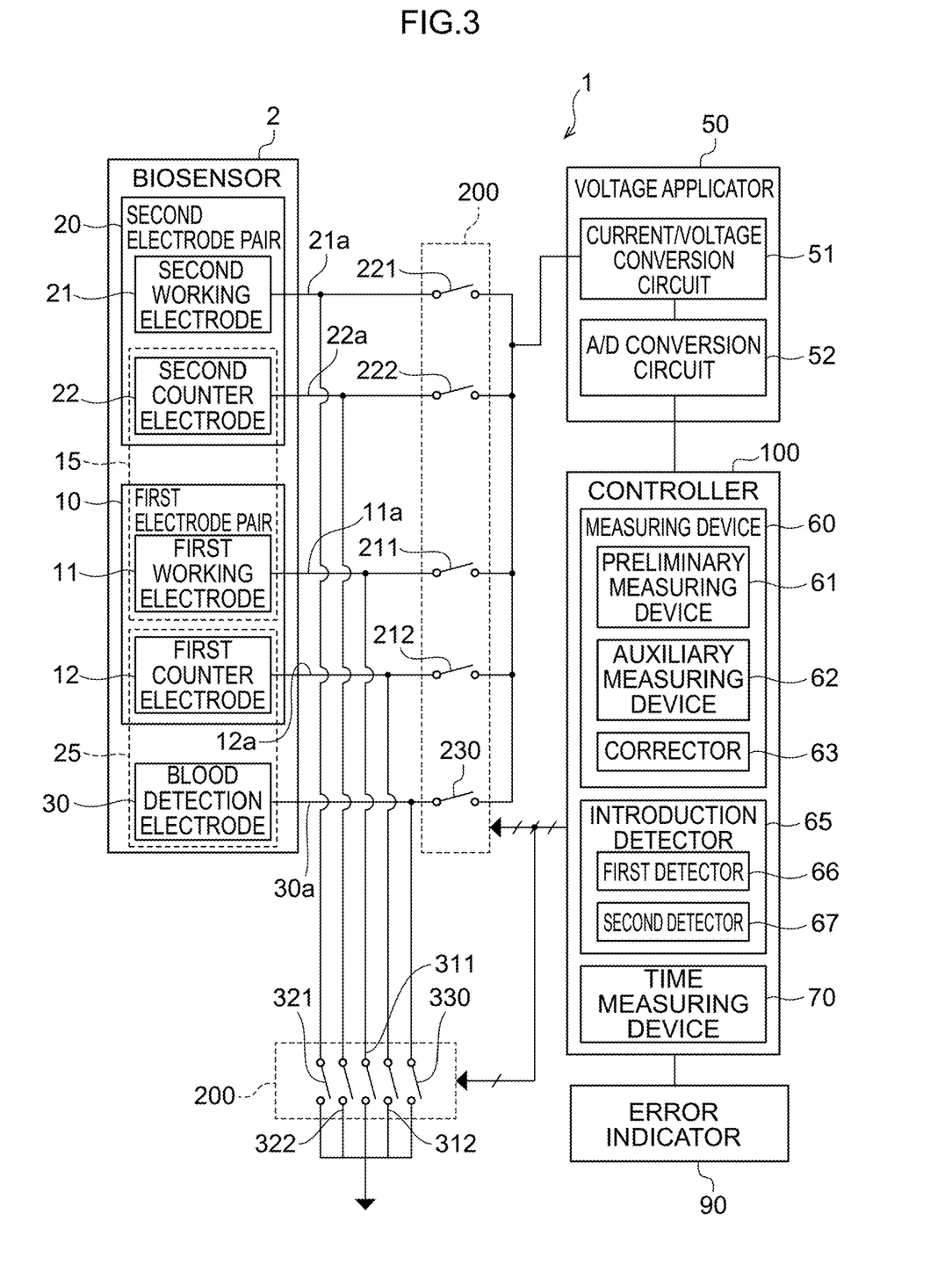
FIG. 3 is a block diagram illustrating functions of the measurement apparatus.

The measurement apparatus 1 includes a main body 1a, and the main body 1a is provided with an insertion port 1b for inserting the strip-shaped biosensor 2. In addition, the main body 1a is provided with a controller 100 that is configured by, for example, a microprocessor, and controls each unit of the measurement apparatus 1. Furthermore, as illustrated in FIG. 3, the main body 1a includes the controller 100 including a voltage applicator 50 that supplies a predetermined voltage signal to the biosensor 2, receives a voltage signal indicating a measurement result from the biosensor 2, and performs A/D conversion, a measuring device 60 that generates measurement data indicating a value, and a recording unit (not illustrated) that records the measurement data obtained by the measuring unit. The measurement data obtained by the measuring device 60 is recorded in the recording unit in association with the measurement time, the patient ID, and the like.

In addition, the main body 1a is provided with a display screen 1c for displaying measurement data and a connector 1d for performing data communication with an external device. Through the connector 1d, it is possible to transmit and receive data such as measurement data, measurement time, and patient ID to and from a portable device such as a smartphone serving as an external device, a personal computer, or the like. That is, the measurement apparatus 1 is configured to be able to transfer measurement data and measurement time to an external device through the connector 1d interposed therebetween, and receive the patient ID and the like from the external device and associate the patient ID and the like with the measurement data and the like.

Note that, other than the description made above, for example, the measuring device 60 may be provided at an end of the biosensor 2, and the measurement data may be generated in the biosensor 2 side. In addition, the main body 1*a* of the measurement apparatus 1 may include a user interface including an input unit such as a button or a touch panel for a user such as a patient to input data. Furthermore, the display screen 1*c*, the recording unit, and the like may be provided in an external device connectable to the main body 1*a* without being provided in the main body 1*a*.

Figure 2:
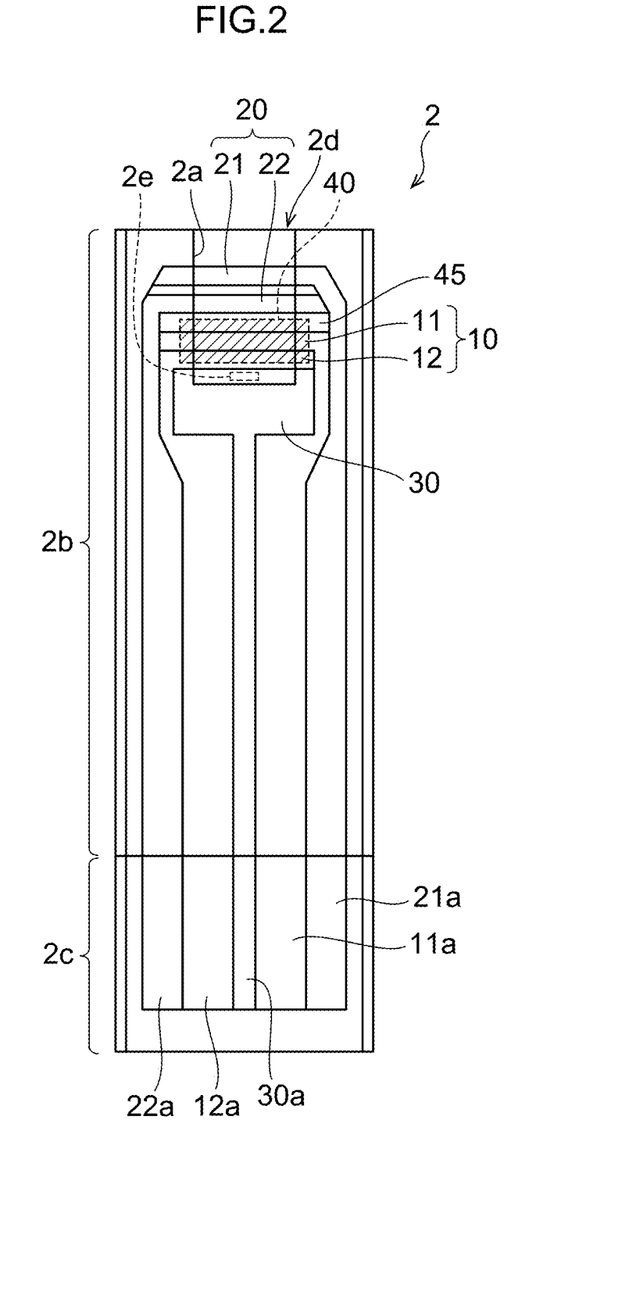
FIG. 2 is a schematic diagram illustrating a schematic configuration of a biosensor.

FIG. 2 is a schematic view of the biosensor 2 used in the measurement apparatus 1 of the present exemplary embodiment. In the figure, the upper side is the upstream side, and the lower side is the downstream side. In the biosensor 2, for example, an electrode layer formed using a metal material such as gold (Au) or a carbon material such as carbon is formed on a substrate formed using, for example, a synthetic resin (plastic). On the electrode layer, a spacer (not shown) having a rectangular cutout portion as a covering region 2*b*, and a cover made of a synthetic resin (not shown) formed with an air hole 2*e* provided thereon are stacked. By stacking the substrate, the spacer, and the cover, a space having the blood supply port 2*d* formed by the cutout portion of the spacer is formed, and this space becomes the flow path 2*a*. The air hole 2*e* is formed near the downstream end of the flow path 2*a*.

In the present exemplary embodiment, the electrode layer is formed such that five electrodes of the first working electrode 11 and the first counter electrode 12 serving as the first electrode pair 10, the second working electrode 21 and the second counter electrode 22 serving as the second electrode pair 20, and the blood detection electrode 30 are exposed in a rectangular shape in parallel to the longitudinal direction and the width direction of the biosensor 2 in the flow path 2*a*, and the first electrode pair 10, the second electrode pair 20, and the blood detection electrode 30 exposed to the flow path 2*a* come into contact with the introduced blood and function as a measurement region. Note that adjacent electrodes are insulated from each other. For example, when the electrode layer is formed of a metal material formed by physical vapor deposition, each of the electrodes are insulated from each other by drawing (trimming) a predetermined electrode pattern with laser light. In the case of an electrode layer formed using a carbon material, respective electrodes are formed at predetermined intervals. The electrode layer of the present exemplary embodiment is formed using a nickel-vanadium alloy.

Each electrode extends along the longitudinal direction of biosensor 2, and is bent in the width direction on the upstream end side. The bent portion is located in parallel in the width direction in the order of the second working electrode 21, the second counter electrode 22, the first working electrode 11, the first counter electrode 12, and the blood detection electrode 30 from the upstream side. Each electrode is covered with the cover (not illustrated) in the covering region 2*b* from the upstream end to the vicinity of the downstream end of the biosensor 2, but the downstream end portion is exposed without being covered, and this portion is the connector region 2*c* to be inserted into the insertion port 1*b* of the main body 1*a*. In the connector region 2*c*, the lead portion 11*a* of the first working electrode 11, the lead portion 12*a* of the first counter electrode 12, the lead portion 21*a* of the second working electrode 21, the lead portion 22*a* of the second counter electrode 22, and the lead portion 30*a* of the blood detection electrode 30 are exposed contacts.

A gap is formed between each electrode and a cover (not illustrated) in a central portion in a width direction of an upstream portion of the biosensor 2. This gap is a capillary-like flow path 2*a* into which blood containing the target is introduced and flows as described above. In addition, a non-conductive region 45, which is a gap between the second counter electrode 22, which is the second electrode from the upstream side, and the first working electrode 11, which is the third electrode, is wider than the gap between the other electrodes. The non-conductive region 45 is a region formed by being insulated from other electrodes by drawing a rectangular pattern on the electrode layer with a laser light. Further, a reagent 40 is disposed on the first working electrode 11. The region where the reagent 40 is disposed reaches the middle of the first counter electrode 12 at the downstream side, and reaches the middle of the non-conductive region 45 on the upstream side, but does not reach the second counter electrode 22. In other words, since the first working electrode 11 and the second counter electrode 22 are separated from each other by the non-conductive region 45, contact between the reagent 40 disposed on the first working electrode 11 and the second counter electrode 22 is prevented. When blood is spot-applied to the blood supply port 2*d* of the biosensor 2, the blood flows to the downstream side in the order of the second working electrode 21, the second counter electrode 22, the first working electrode 11, the first counter electrode 12, and the blood detection electrode 30 in the flow path 2*a* by capillary force. At this time, when the blood reaches the first working electrode 11, the reagent 40 disposed on the first working electrode 11 is dissolved by the blood.

FIG. 3 is a block diagram illustrating functions of the measurement apparatus 1 of the present exemplary embodiment. As described above, the measurement apparatus 1 of the present exemplary embodiment includes the biosensor 2 including the first electrode pair 10 including the first working electrode 11 and the first counter electrode 12 that measure the target in the blood, the second electrode pair 20 being formed on the upstream side of the first electrode pair 10 and including the second working electrode 21 and the second counter electrode 22, the blood detection electrode 30 formed at the downstream side of the first electrode pair 10, and the reagent 40 that is disposed in contact with at least the first working electrode 11 and reacts with the target. Moreover, the second counter electrode 22 and the first working electrode 11 constitute an upstream electrode pair 15, and the first counter electrode 12 and the blood detection electrode 30 at the downstream side constitute a downstream electrode pair 25. As described above, the reagent 40 is disposed on the first working electrode 11 which is one of the electrodes configuring the upstream electrode pair 15.

Lead portions 11*a*, 12*a*, 21*a*, 22*a*, and 30*a* of the respective electrodes of the biosensor 2 are connected in parallel to the voltage applicator 50 and the ground, described later, by a connection circuit 200. In the connection circuit 200, a first working electrode switch 211 is provided between the voltage applicator 50 and the lead portion 11*a*, a first counter electrode switch 212 is provided between the voltage applicator 50 and the lead portion 12*a*, a second working electrode switch 221 is provided between the voltage applicator 50 and the lead portion 21*a*, a second counter electrode switch 222 is provided between the voltage applicator 50 and the lead portion 22*a*, and a blood detection electrode switch 230 is provided between the voltage applicator 50 and the lead portion 30*a*.

Furthermore, the lead portions 11*a*, 12*a*, 21*a*, 22*a*, and 30*a* of the respective electrodes and the switches 211, 212, 221, 222, and 230 corresponding thereto are branched from each other and are connected in parallel to the ground. Further, the connection circuit 200 between each branch point and the ground is provided with a first working electrode ground switch 311, a first counter electrode ground switch 312, a second working electrode ground switch 321, a second counter electrode ground switch 322, and a blood detection electrode ground switch 330. Each switch is an electronic switch, and is on/off-controlled by the controller 100, as described later.

The measurement apparatus 1 includes the voltage applicator 50 including a power supply. The voltage applicator 50 can be connected to each electrode through the connection circuit 200. In addition, the voltage applicator 50 includes a current/voltage conversion circuit 51 that converts a current flowing between the electrodes into a voltage and outputs the voltage, and an A/D conversion circuit 52 that converts a voltage value from the current/voltage conversion circuit 51 into a pulse. The voltage applicator 50 can apply a voltage between the electrodes and acquire a response current value flowing between the electrodes by turning on a desired switch corresponding to the electrode to be used by the controller 100 and variably controlling the voltage to apply between the electrodes at the ground.

The measurement apparatus 1 further includes the controller 100, which is a central control device that executes a predetermined program. The controller 100 includes a measuring device 60 (referred to as a preliminary measuring device 61 when acquiring first information, referred to as an auxiliary measuring device 62 when acquiring second information, or referred to as a corrector 63 when correcting a parameter) that acquires a parameter corresponding to first information related to a target (e.g., the glucose value) and second information related to a measurement item (e.g., the hematocrit value) different from the target based on a pulse from the A/D conversion circuit 52 of the voltage applicator 50 and further corrects the parameter, an introduction detector 65 (referred to as a first detector 66 when detecting a first introduction, and referred to as a second detector 67 when detecting a second introduction) that detects a first introduction and a second introduction, and a time measuring device 70 that measures a time difference from the detection of the first introduction to the detection of the second introduction.

The measurement apparatus 1 further includes an error indicator 90 that displays an error when the time difference measured by the time measuring device 70 exceeds the limit value.

Hereinafter, each detection step and each measurement step will be described with reference to the following Table 1 showing an open/close state of each switch.

TABLE 1

| Switch | First detection step | Second detection step | Preliminary measurement step | Auxiliary measurement step |
|---|---|---|---|---|
| Second working electrode switch 221 | OPEN | OPEN | OPEN | CLOSE 3.5 V |
| Second working electrode ground switch 321 | OPEN | OPEN | OPEN | OPEN |
| Second counter electrode switch 222 | CLOSE 200 mV | OPEN | OPEN | OPEN |
| Second counter electrode ground switch 322 | OPEN | OPEN | OPEN | CLOSE GND |
| First working electrode switch 211 | OPEN | OPEN | CLOSE 200 mV | OPEN |
| First working electrode ground switch 311 | CLOSE GND | OPEN | OPEN | OPEN |
| First counter electrode switch 212 | OPEN | CLOSE 200 mV | OPEN | OPEN |
| First counter electrode ground switch 312 | OPEN | OPEN | CLOSE GND | OPEN |
| Blood detection electrode switch 230 | OPEN | OPEN | OPEN | OPEN |
| Blood detection electrode ground switch 330 | OPEN | CLOSE GND | OPEN | OPEN |

In the first detection step described in (1), the upstream electrode pair 15 configured by the second counter electrode 22 and the first working electrode 11 is used. In the first detection step, first, the controller 100 controls the second counter electrode switch 222 and the first working electrode ground switch 311 to be in the connected state (CLOSE) and the other switches to be in the non-connected state (OPEN) (see Table 1). Next, the voltage applicator 50 applies a steady voltage (e.g., 200 mV) between the second counter electrode 22 and the first working electrode 11. At this time, the controller 100 controls the second counter electrode switch 222 to open and close at a predetermined cycle, so that a pulse voltage can be periodically applied between these electrodes. When blood is introduced to the first working electrode 11, the measuring device 60 can measure the peak value of the response current corresponding to the applied pulse voltage. The introduction detector 65 (first detector 66) determines whether or not the peak value of the response current measured by the measuring device 60 exceeds a predetermined current threshold value, and detects the first introduction when the peak value exceeds the predetermined current threshold value.

In the present exemplary embodiment described above, the second counter electrode 22 is assumed as a working electrode. When the blood spot-applied to the biosensor 2 is insufficient, a relatively large amount of blood exists on the electrode located on the upstream side, but the amount of blood is small on the electrode located at the downstream side. Therefore, the flow of current tends to easily occur by assuming the second counter electrode 22 located on the upstream side as the working electrode, so that the accuracy of detecting the shortage of the blood can be increased.

On the other hand, when the first working electrode 11 located at the downstream side is assumed as the working electrode, the working electrode can be made common to the first working electrode 11 in the preliminary measurement step described later. Accordingly, the configuration of the electric circuit can be simplified. In this case, it is necessary to perform control so that the first working electrode switch 211 and the second counter electrode ground switch 322 are in a connected state.

In FIG. 3, the second counter electrode 22 located at the downstream side of the second electrode pair 20 is a part of the upstream electrode pair 15, but the second working electrode 21 is a part of the upstream electrode pair 15 when the second working electrode 21 is disposed at the downstream side. Furthermore, in FIG. 3, the first working electrode 11 located on the upstream side of the first electrode pair 10 is a part of the upstream electrode pair 15, but the first counter electrode 12 is a part of the upstream electrode pair 15 when the first counter electrode 12 is disposed on the upstream side and the reagent 40 is also disposed on the first counter electrode 12. The voltage value of the applied pulse voltage is desirably set, for example, in a range of from 50 to 1000 mV, more preferably in a range of from 100 to 600 mV. The peak value of the response current is desirably set to, for example, 0.3 µA or larger, and more preferably 0.7 µA or larger.

In the second detection step described in (1), the downstream electrode pair 25 configured by the first counter electrode 12 and the blood detection electrode 30 is used. In the second detection step, first, the controller 100 controls the first counter electrode switch 212 and the blood detection electrode ground switch 330 to be in the connected state and the other switches to be in the non-connected state (see Table 1). Next, the voltage applicator 50 applies a steady voltage (e.g., 200 mV) between the first counter electrode 12 and the blood detection electrode 30. At this time, the controller 100 controls the first counter electrode switch 212 to normally be in the connected state, so that a DC voltage can be periodically applied between these electrodes. When blood is introduced to the blood detection electrode 30, the measuring device 60 can measure the peak value of the response current corresponding to the applied DC voltage. The introduction detector 65 (second detector 67) determines whether or not the peak value of the response current measured by the measuring device 60 exceeds a predetermined current threshold value, and detects the second introduction when the peak value exceeds the predetermined current threshold value.

In the present exemplary embodiment, the first counter electrode 12 located at the downstream side of the first electrode pair 10 is a part of the downstream electrode pair 25, but the first working electrode 11 located on the upstream side may be a part of the downstream electrode pair 25. The voltage value of the applied DC voltage is desirably set, for example, in a range of from 50 to 1000 mV, more preferably in a range of from 100 to 600 mV. Moreover, the peak value of the response current is desirably set to, for example, 0.1 µA or larger, and more preferably 0.15 µA or larger. Further, the DC voltage is applied in the present exemplary embodiment, but the controller 100 may control the first counter electrode switch 212 to open and close at a predetermined cycle, so that a pulse voltage can be applied. In this case, the measuring device 60 may measure the peak value of the response current value in response to the pulse voltage or the current value after elapse of a predetermined time from the initial response, and the introduction detector 65 (second detector 67) may determine whether or not the current value exceeds a predetermined current threshold, so that the second introduction may be detected.

The time measuring device 70 performs the time measurement step described in (1) above. The time measuring device 70 measures a time difference from a temporal reference point at which the first introduction detected by the introduction detector 65 is detected, to a temporal reference point at which the second introduction is detected. A central control device (CPU) that executes a predetermined program can be assigned as the time measuring device 70 in a controller 100 of the measurement apparatus.

In the preliminary measurement step described in (1), the first electrode pair 10, that is, the first working electrode 11 and the first counter electrode 12 are used. In the preliminary measurement step, first, the controller 100 controls the first working electrode switch 211 and the first counter electrode ground switch 312 to be in the connected state and the other switches to be in the non-connected state (see Table 1). Next, when the voltage applicator 50 applies a DC voltage (e.g., 200 mV) to the first electrode pair 10, the measuring device 60 (preliminary measuring device 61) measures a response current value serving as first information corresponding to the applied DC voltage. The voltage value of the applied DC voltage is desirably set, for example, in a range of from 100 to 1000 mV, more preferably in a range of from 200 to 500 mV.

The response current value measured by the preliminary measuring device 61 may be used as the first information with the value as it is. In addition, a value converted into the concentration of the target may be used as the first information by referring to a calibration curve or a comparative table created with a response current value measured with the target having a known concentration in advance.

Furthermore, in the auxiliary measurement step of measuring the second information, the second electrode pair 20, that is, the second working electrode 21 and the second counter electrode 22 are used. In the auxiliary measurement step, first, the controller 100 controls the second working electrode switch 221 and the second counter electrode ground switch 322 to be in the connected state and the other switches to be in the non-connected state either before or after measuring the first information (see Table 1). Next, when the voltage applicator 50 applies a DC voltage (e.g., 3.5V) to the second electrode pair 20, the measuring device 60 (auxiliary measuring device 62) measures a response current value serving as second information corresponding to the applied DC voltage. The voltage value of the applied DC voltage is desirably set, for example, in a range of from 2 to 20V, more preferably in a range of from 3 to 10V.

The response current value measured by the auxiliary measuring device 62 may be used as the second information with the value as it is. In addition, a value converted into a numerical value of the measurement item may be used as the second information by referring to a calibration curve or a comparative table created with a response current value measured with another blood known for the measurement item (e.g., the hematocrit value) of the auxiliary measuring device 62 in advance.

The corrector 63 performs the time correction step described in (1) above. That is, the corrector 63 corrects the first information as the parameter based on the time difference measured by the time measuring device 70 and the second information, and calculates the concentration of the target as the value. A central control device (CPU) that executes a predetermined program can be assigned as the corrector 63 in a controller of the measurement apparatus. The correction of the parameter in the corrector 63 is similar to the description in the correction step of (1) above.

The error indicator 90 is realized as, for example, a device that displays an error message or emits a warning sound by voice when the time difference measured by the time measuring device 70 exceeds a predetermined value. For example, with the display screen 1c in the measurement apparatus 1 of FIG. 1 as the error indicator 90, an error message can be displayed thereon.

(3) Measurement Example

Figure 4:
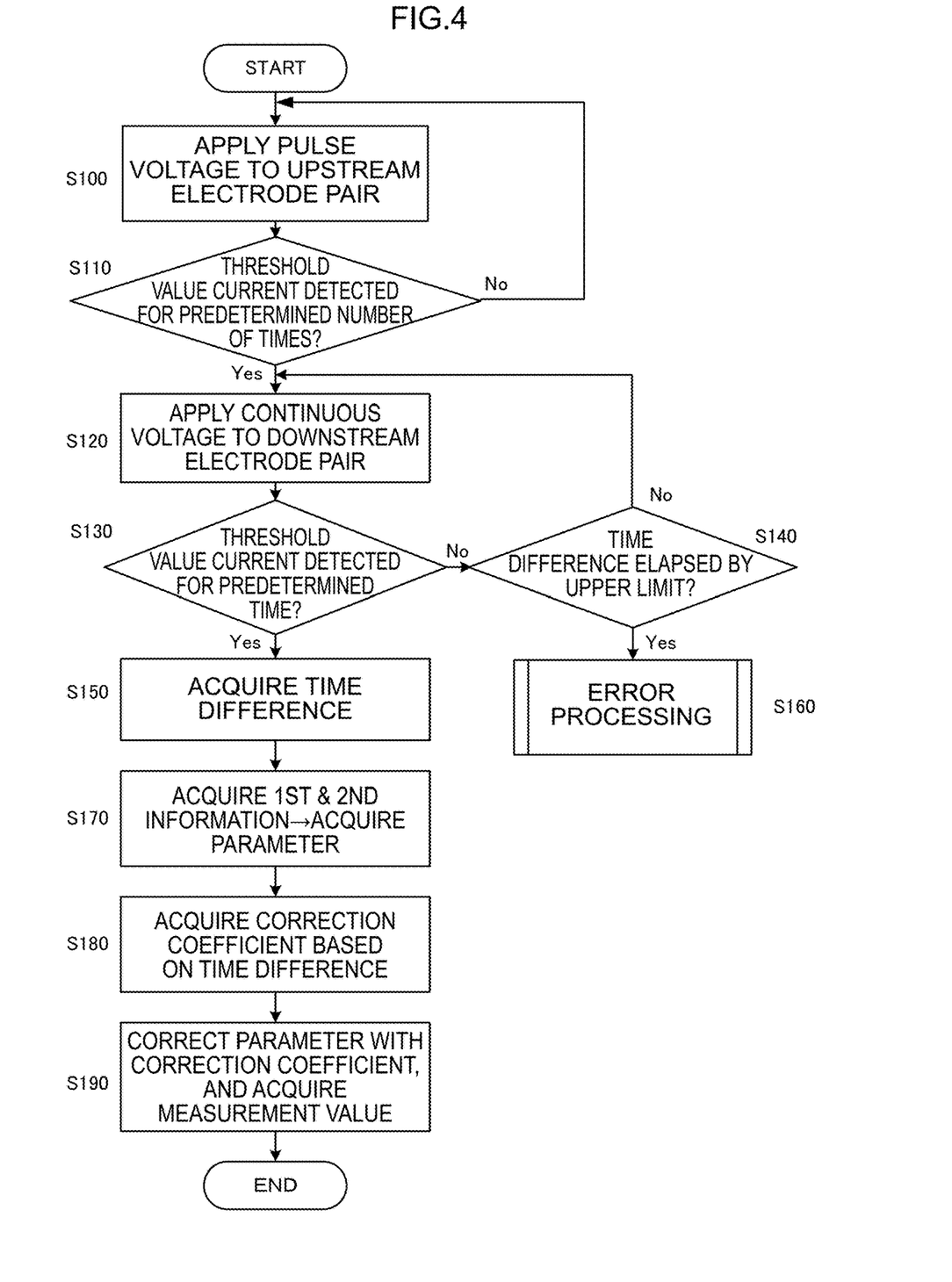
FIG. 4 is a flowchart illustrating an example of a measurement method according to an exemplary embodiment.

Hereinafter, an example of the measurement method of the present exemplary embodiment will be described with reference to the flowchart of FIG. 4. In this example, the glucose value is measured as the first information, and the hematocrit value is measured as the second information. The glucose value acquired as the first information is a value subjected to the influence of the hematocrit value in the blood, and needs to be corrected based on the hematocrit value acquired as the second information.

The biosensor 2 shown in FIG. 2 is formed, for example, by providing each electrode on a substrate having a width of 6 mm and a length of 30 mm. The flow path 2a has a width of, for example, 2 mm and a length of 4 mm.

First, an example of the composition of the reagent 40 disposed on the first working electrode 11 is as follows.

Hexamine ruthenium chloride (III): 38.9 mass %
1-methoxy PES (Dojindo Laboratories): 0.2 mass %
SN Deformer 1315 (San Nopco): 0.1 mass %
0.6 M phosphate buffer (pH 7.0): 8.8 mass %
CHAPS (Dojindo Laboratories): 4.0 mass %
Glycine: 4.0 mass %
Distilled water: 44.0 mass %

Zero point one milligram of the reagent 40 having this composition is applied to a region having a width of 3 mm and a length of 1 mm around the first working electrode 11. This region is adjusted so as to cover up to about a middle of the first counter electrode 12 at the downstream side and up to about a middle of the non-conductive region 45 on the upstream side. In addition, 4.1 units of glucose dehydrogenase (AMANO 8, Amano Enzyme) are applied to the region to which the reagent 40 has been applied.

The biosensor 2 is attached to the connector 1d of the main body 1a of the measurement apparatus 1. In the first detection step shown in S100 of FIG. 4, first, the controller 100 controls the second counter electrode switch 222 and the first working electrode ground switch 311 to be in the connected state and the other switches to be in the non-connected state (see Table 1). Next, a steady voltage of 200 mV is applied between the upstream electrode pair 15 (the second counter electrode 22 and the first working electrode 11) by the voltage applicator 50. Subsequently, when blood is spot-applied to the flow path 2a and blood is filled on the second counter electrode 22 and the first working electrode 11, a current of 0.7 µA or larger, which is a threshold value current, is measured by the measuring device 60. Accordingly, it is detected that the electrodes are electrically connected to each other. After the first detection of the current of 0.7 µA or larger, the controller 100 controls to open and close the second counter electrode switch 222 at a predetermined cycle of 2.5 msec, whereby the voltage application method is changed such that a pulse voltage in which the voltage application of 500 mV for 2.5 msec and the application stop for 2.5 msec are repeated is applied between the electrodes.

Figure 5:
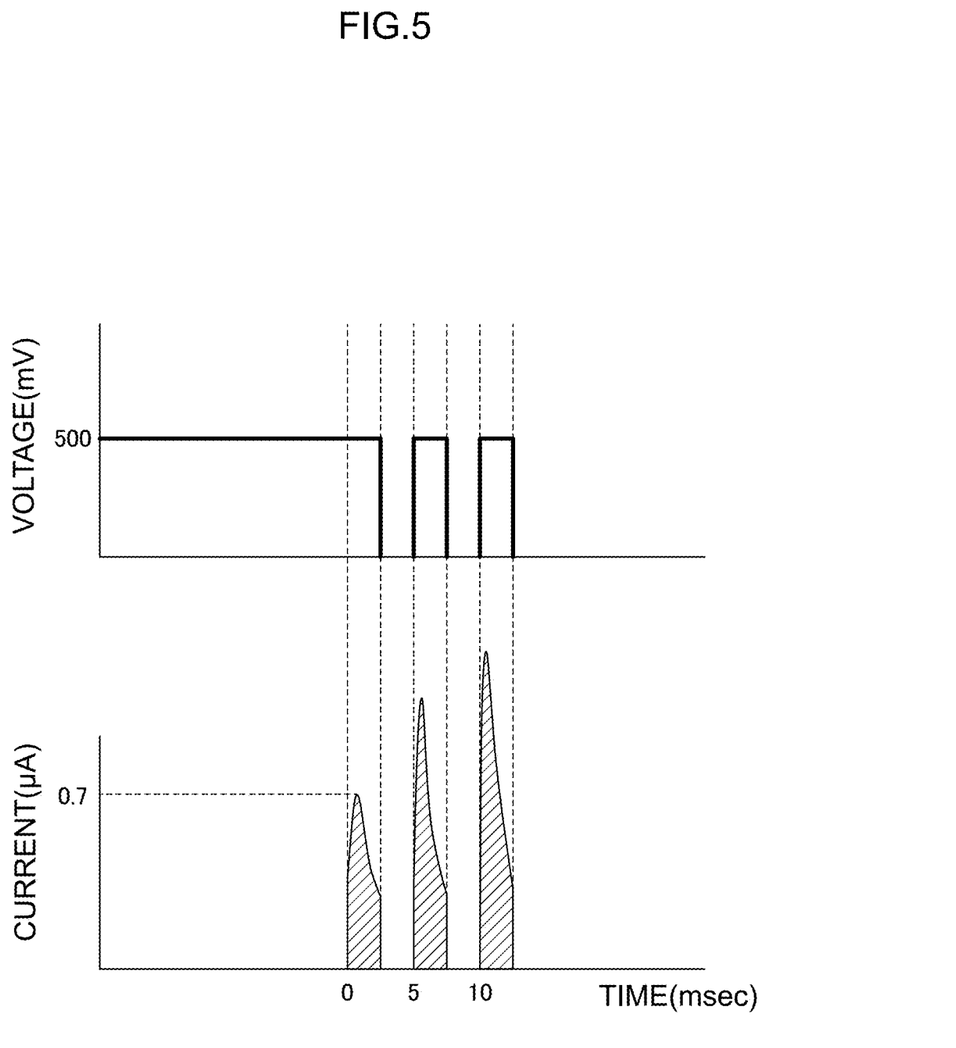
FIG. 5 is a graph showing a relationship between a pulse voltage application and a response current corresponding thereto.

FIG. 5 is a graph illustrating a relationship between voltage application and current. When the initial steady voltage or the second and subsequent pulse voltages are applied as in the upper graph, a current having a peak indicating a transient response is generated as in the lower graph. Whether the peak value, which is the current value of the peak, is detected to be the threshold value current of 0.7 µA or larger for a predetermined number of times, specifically, three times is determined by the introduction detector 65 (first detector 66) in the stage shown in S110. The application of the voltage is repeated until the peak value of the threshold value or larger is detected three times. The initial voltage application method may be not a steady voltage of 200 mV, but a pulse voltage (AC voltage) in which the voltage application of 500 mV for 2.5 msec and the application stop for 2.5 msec are repeated as in the second and subsequent times.

As illustrated in FIG. 5, the first peak value tends to be lower than the subsequent peak value. It is considered that this is because the blood has not reached the entire surface of the first working electrode 11 and the reagent has not been completely dissolved by the blood at the time point when the current having the first peak is generated. Therefore, the current threshold value (first current threshold value) at the first peak value is preferably higher than the current threshold value (second current threshold value) at the subsequent peak value. The current threshold value at the first peak value can be set to, for example, from 0.2 to 0.5 µA, and more preferably to 0.35 µA.

When the peak value of the threshold value or larger is detected three times and the first introduction is detected at the stage shown in S110, in the second detection step shown in S120, the controller 100 controls the first counter electrode switch 212 and the blood detection electrode ground switch 330 to be in the connected state and the other switches to be in the non-connected state (see Table 1). Then, a continuous voltage of 200 mV is applied between the downstream electrode pair 25 (the first counter electrode 12 and the blood detection electrode 30) by the voltage applicator 50. The peak value of the current similar to FIG. 5 is detected by the measuring device 60. The introduction detector 65 (second detector 67) determines whether it is detected that the peak value is maintained for a predetermined time, specifically, 15 msec at the threshold value current of 0.15 µA or larger at the stage shown in S130. If this detection is not performed, in the time measurement step shown in S140, the time measuring device 70 determines whether or not the upper limit time, specifically 10 seconds, has elapsed since the detection of the first introduction. If the time has not elapsed, the application of the voltage is repeated again at a stage shown in S120. On the other hand, when it is determined that the upper limit time has elapsed, error processing is performed by the error indicator 90 in the error processing step shown in S160, and the subsequent processing is stopped.

On the other hand, when the peak value of the threshold value current or larger continues for 15 msec or longer and the second introduction is detected at the stage shown in S130, the time measuring device 70 acquires the time difference from the detection of the first introduction to the detection of the second introduction in the time measurement step shown in S150. That is, the time difference from a temporal reference point at which the first introduction detected to a temporal reference point at which the second introduction is detected is measured.

Next, in the preliminary measurement step shown in S170, the first information is measured by the measuring device 60 (preliminary measuring device 61). At the same time, in the auxiliary measurement step, the second information is measured by the measuring device 60 (auxiliary measuring device 62).

In the measurement of the first information, first, the controller 100 controls the first working electrode switch 211 and the first counter electrode ground switch 312 to be in the connected state and the other switches to be in the non-connected state (see Table 1). Next, a voltage of 200 mV is applied by the voltage applicator 50 to the first electrode pair 10 for 4.5 seconds, and the first information serving as a response current value associated therewith is measured by the measuring device 60 (preliminary measuring device 61). Moreover, in the measurement of the second information, first, the controller 100 controls the second working electrode switch 221 and the second counter electrode ground switch 322 to be in the connected state and the other switches to be in the non-connected state (see Table 1). Next, a voltage of 3.5V is applied by the voltage applicator 50 to the second electrode pair 20 for one second, and the second information serving as a response current value associated therewith is measured by the measuring device 60 (auxiliary measuring device 62). Furthermore, a glucose value as a parameter is calculated by applying the response current value of the first information to a predetermined calibration curve.

Figure 6:
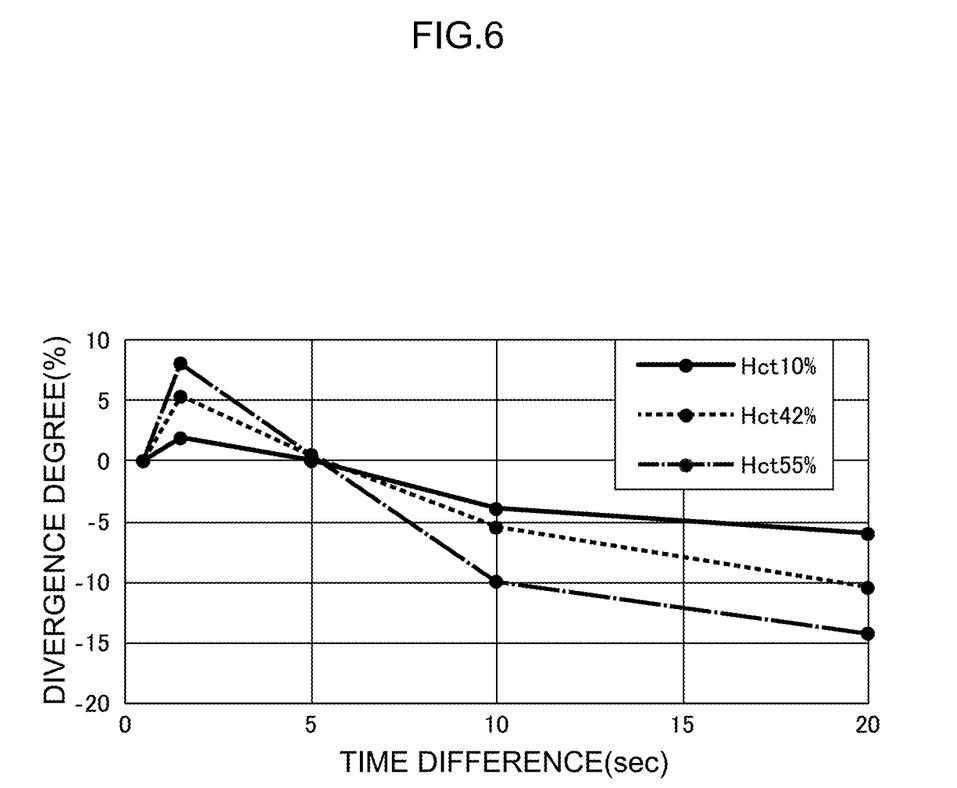
FIG. 6 is a graph showing a relationship between a time difference of an additional spot-application and a divergence degree of a glucose value.

Then, in the correction step shown in S180, the corrector 63 acquires the correction coefficient from the hematocrit value and the time difference of the second information. Here, FIG. 6 illustrates an example in which the time difference from the first introduction to the second introduction, that is, the relationship between the time difference from the temporal reference point at which the first introduction is detected to the temporal reference point at which the second introduction is detected and the divergence degree was actually measured. FIG. 6 is a graph plotted, in accordance with time difference, a divergence degree (%) with respect to a response current value (i.e., glucose value) of when the blood was not additionally spot-applied (i.e., when the entire flow path was filled with one spot-application of the blood) of the response current value (i.e., glucose value) measured after the entire flow path was filled by additionally spot-applying the blood after 1.5 seconds, 5 seconds, 10 seconds, and 20 seconds after spot-applying blood, known to have a constant glucose value and hematocrit values of 10%, 42%, and 55%, to the biosensor 2 by an amount of reaching to satisfy the upstream electrode pair that detected the first introduction but not reaching the downstream electrode pair that detected the second introduction. Each plot is an average value of 45 blood samples. Each divergence degree (%) is a value calculated by Formula (1). Note that a plot of a time difference of 0.5 seconds indicates a time difference in a case where the additional spot-application was not performed. That is, the divergence degree (%) of 0.5 seconds is the response current value itself in a case where the additional spot-application was not performed, and $P_0-P_t=0$ was obtained based on Formula (1), where X in Formula (1) was also 0, and the correction coefficient C in Formula (2) was 1. As a result, at any hematocrit level, a peak of a positive divergence degree was indicated at a time difference of 1.5 seconds, and thereafter, the divergence degree was positive and the correction coefficient C was less than 1 until 5 seconds, but after 5 seconds, the negative divergence degree increased as the time difference increased, and the correction coefficient C became 1 or larger. In addition, the absolute value of the divergence degree increased as the hematocrit value became higher. This is considered to be because higher hematocrit values caused higher viscosity, and hence the reagent dissolved by the first spot-application was less likely to diffuse. In addition, it is considered that since the viscosity was high, the range of the diffusion layer of the reagent that reacted with glucose, which was the target, was small, and hence a slight change in the reagent diffusion state located very near the electrode surface might reflect on the measured current value. Furthermore, when the time difference exceeded 10 seconds, the divergence degree increased, and it is considered that effective correction cannot be performed, and thus a time difference of up to 10 seconds was allowed for the additional spot-application.

Then, the correction coefficient calculated by the above Formula (2) from the divergence degree of FIG. 6 is shown in the following Table 2.

TABLE 2

| Hematocrit value | Time difference (sec) | | | |
|---|---|---|---|---|
| | 0.5 | 1.5 | 5 | 10 |
| 10% | 1 | 0.98 | 1 | 1.04 |
| 42% | 1 | 0.95 | 1 | 1.06 |
| 55% | 1 | 0.92 | 1 | 1.11 |

In the correction step, at the stage shown in S180, a correction coefficient calculated based on the hematocrit value and the time difference as shown in Table 2 is acquired for the glucose value serving as a parameter calculated from the first information. The correction coefficient corresponding to the hematocrit level and the time difference not shown in the above table can be calculated by linearly interpolating the numerical values in the above table. Then, at the stage shown in S190, the glucose value serving as a parameter is multiplied by the correction coefficient to calculate the glucose value. Since the divergence degree is 0 up to the time difference of 0.5 seconds, it is not necessary to correct the glucose value as a parameter.

In the above measurement example, when the time difference is less than 0.5 seconds, the correction based on the time difference is not performed (the numerical value of the parameter is not changed), when the time difference is 0.5 seconds or more but less than 5 seconds, the correction to decrease the numerical value of the parameter is performed, and when the time difference is from 5 seconds to 10 seconds, the correction to increase the numerical value of the parameter is performed, but the time to be set as the predetermined value and the numerical value of the correction coefficient may be adjusted, if appropriate, according to the biosensor by the characteristics (viscosity, enzyme activity, etc.) of the reagent in the biosensor to be used, various conditions of the biosensor including the distance between the upstream electrode pair and the downstream electrode pair, the length and the width of the flow path, the detection method for the first introduction and the second introduction, or the method of measuring the value of the target. However, since the tendency of the divergence degree to become positive when the time difference is less than a predetermined value and to be negative when the time difference is the predetermined value or larger depends on the degree of dissolution of the reagent and the degree of reaction between the reagent and the target, and thus the same tendency can be obtained regardless of the kind of biosensor used.

Furthermore, in the above measurement example, the biosensor 2 including five electrodes of the first working electrode 11 and the first counter electrode 12 serving as the first electrode pair 10, the second working electrode 21 and the second counter electrode 22 serving as the second electrode pair 20, and the blood detection electrode 30 in the flow path 2*a* is used, but the present invention can be applied as long as it is a biosensor 2 in which the upstream electrode pair 15 on which the reagent 40 that reacts with the target is disposed in the flow path 2*a* and the downstream electrode pair 25 formed at the downstream side of the upstream electrode pair 15 are formed. As a biosensor of a modified example, Modified Example 1 and Modified Example 2 will be described below.

(4) Modified Example 1

A biosensor 2 of the Modified Example 1 has a configuration in which the blood detection electrode 30 is not provided in the biosensor 2 in FIG. 2 and FIG. 3 in the configuration of (2) described above. That is, the biosensor 2 is provided with only four electrodes of the first electrode pair 10 and the second electrode pair 20. Although the configuration of the biosensor 2 of the Modified Example 1 is similar to that shown in (2) above in that the second counter electrode 22 of the second electrode pair 20 and the first working electrode 11 of the first electrode pair 10 form the upstream electrode pair 15, the configuration of the biosensor 2 of the Modified Example 1 is different from that shown in (2) above in that the first electrode pair 10 is directly used as the downstream electrode pair 25. Even with such a configuration, measurement according to a similar measurement example as in the (3) described above can be performed.

(5) Modified Example 2

Figure 7:
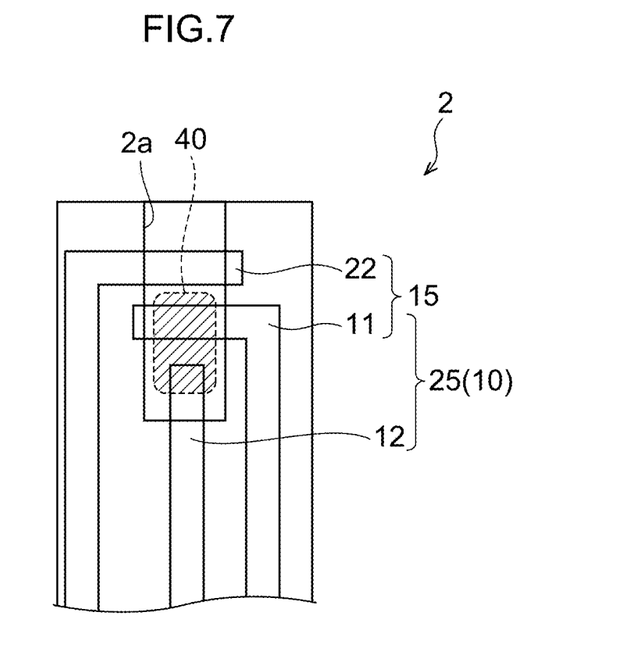
FIG. 7 is a schematic diagram illustrating a schematic configuration of a modified example of the biosensor.

A biosensor 2 of Modified Example 2 has a schematic configuration as illustrated in FIG. 7. That is, only three electrodes of the second counter electrode 22 for measuring the hematocrit value and the first electrode pair 10 (the first working electrode 11 and the first counter electrode 12) are provided from the upstream side of the flow path 2a. Even with such a configuration, measurement according to a similar measurement example as in (3) described above can be performed by using two electrodes on the upstream side, that is, the second counter electrode 22 and the first working electrode 11, as the upstream electrode pair 15, and two electrodes at the downstream side, that is, the first working electrode 11 and the first counter electrode 12, as the downstream electrode pair 25.

INDUSTRIAL APPLICABILITY

The present invention can be used as a portable blood glucose value or a self-measurement blood glucose meter using a biosensor. In addition, it can also be used as a measurement apparatus capable of measuring measurement items other than blood glucose.

What is claimed is:

1. A measurement method for measuring a value of a target using a biosensor that includes:
   a flow path into which blood containing the target is introduced,
   a pair of upstream electrodes disposed in the flow path and having a reagent, which reacts with the target, disposed on at least one of the upstream electrodes, and
   a pair of downstream electrodes disposed at a downstream side of the flow path with respect to the pair of upstream electrodes, the method comprising:
   a first detection step of detecting, with the pair of upstream electrodes, a first introduction that is an introduction of blood as far as the pair of upstream electrodes;
   a second detection step of detecting, with the pair of downstream electrodes, a second introduction that is an introduction of blood as far as the pair of downstream electrodes;
   a time measurement step of measuring a time difference from a first temporal reference point at which the first introduction is detected, to a second temporal reference point at which the second introduction is detected; and
   a measurement step of acquiring the value related to the target by use of two electrodes based on the time difference measured in the time measurement step, in a state that the time difference is larger than a first preset value, wherein the two electrodes are an electrode on which the reagent is disposed in the pair of upstream electrodes and an electrode provided in the flow path, after the second introduction is detected,
   wherein the target is a chemical component.

2. The measurement method according to claim 1, wherein the measurement step includes a preliminary measurement step of acquiring a parameter related to the target using the two electrodes, and a correction step of correcting the parameter based on the time difference to acquire the value.

3. The measurement method according to claim 2, wherein in the correction step, the parameter is corrected based on the time difference to acquire the value with reference to correction information used for correction calculation of the parameter in accordance with the time difference.

4. The measurement method according to claim 3, wherein the correction information is arithmetic information that decreases a numerical value of the parameter based on that the time difference is less than a predetermined value, and increases the numerical value of the parameter based on that the time difference is the predetermined value or larger.

5. The measurement method according to claim 4, wherein the correction information is the arithmetic information that decreases the numerical value of the parameter based on that the time difference is greater than the first preset value and less than the predetermined value, and increases the numerical value of the parameter based on that the time difference is equal to or greater than the predetermined value and less than a second preset value.

6. The measurement method according to claim 1, wherein in the measurement step, the value is acquired under a measurement condition based on the time difference using the two electrodes.

7. The measurement method according to claim 1, wherein among the two electrodes, an electrode that is not the electrode on which the reagent is disposed is any one of the electrodes configuring the pair of upstream electrodes and the pair of downstream electrodes.

8. The measurement method according to claim 1, further comprising an error processing step of performing error processing when the time difference measured in the time measurement step exceeds a limit value larger than the first preset value.

9. The measurement method according to claim 1, wherein the first preset value is determined as an average value or a median value of a plurality of time differences measured between the first temporal reference point of the first introduction and the second temporal reference point of the second introduction in advance.

10. A measurement apparatus, comprising:
    a biosensor including:
       a flow path into which blood containing a target is introduced,
       a pair of upstream electrodes disposed in the flow path and having a reagent, which reacts with the target, disposed on at least one of the upstream electrodes, and
       a pair of downstream electrodes disposed at a downstream side of the flow path with respect to the pair of upstream electrodes;
    a first detector detecting, with the pair of upstream electrodes, a first introduction that is an introduction of blood to the pair of upstream electrodes;

a second detector detecting, with the pair of downstream electrodes, a second introduction that is an introduction of blood to the pair of downstream electrodes;

a time measuring device measuring a time difference from the detection of the first introduction to the detection of the second introduction; and a measuring device acquiring a value related to the target based on the time difference measured by the time measuring device using two electrodes, in a state that the time difference is larger than a first preset value, wherein the two electrodes are an electrode on which the reagent is disposed of the pair of upstream electrodes and a different electrode provided in the flow path, after the second introduction is detected, wherein the target is a chemical component.

11. The measurement apparatus according to claim 10, wherein the measuring device includes a preliminary measuring device acquiring a parameter related to the target using the two electrodes, and a corrector correcting the parameter based on the time difference to acquire the value.

12. The measurement apparatus according to claim 11, wherein the corrector corrects the parameter based on the time difference to acquire the value with reference to correction information used for correction calculation of the parameter in accordance with the time difference.

13. The measurement apparatus according to claim 12, wherein the correction information is arithmetic information that decreases a numerical value of the parameter based on that the time difference is less than a predetermined value, and increases the numerical value of the parameter based on that the time difference is the predetermined value or larger.

14. The measurement apparatus according to claim 13, wherein the correction information is the arithmetic information that decreases the numerical value of the parameter based on that the time difference is greater than the first preset value and less than the predetermined value, and increases the numerical value of the parameter based on that the time difference is equal to or greater than the predetermined value and less than a second preset value.

15. The measurement apparatus according to claim 10, wherein the measuring device acquires the value under a measurement condition based on the time difference using the two electrodes.

16. The measurement apparatus according to claim 10, wherein the different electrode of the two electrodes is any one of the electrodes configuring the pair of upstream electrodes and the pair of downstream electrodes.

17. The measurement apparatus according to claim 10, wherein the pair of upstream electrodes and the pair of downstream electrodes are configured by different electrodes.

18. The measurement apparatus according to claim 10, further comprising an error indicator that performs error processing when the time difference measured by the time measuring device exceeds a limit value larger than the first preset value.

19. The measurement apparatus according to claim 10, wherein the first preset value is determined as an average value or a median value of a plurality of time differences measured between a first temporal reference point of the first introduction and a second temporal reference point of the second introduction in advance.

* * * * *